March 17, 1959  J. R. BEACH  2,877,698
FOCAL PLANE SHUTTER

Filed May 9, 1955  5 Sheets-Sheet 1

INVENTOR.
JAMES R. BEACH
BY
ATTORNEY

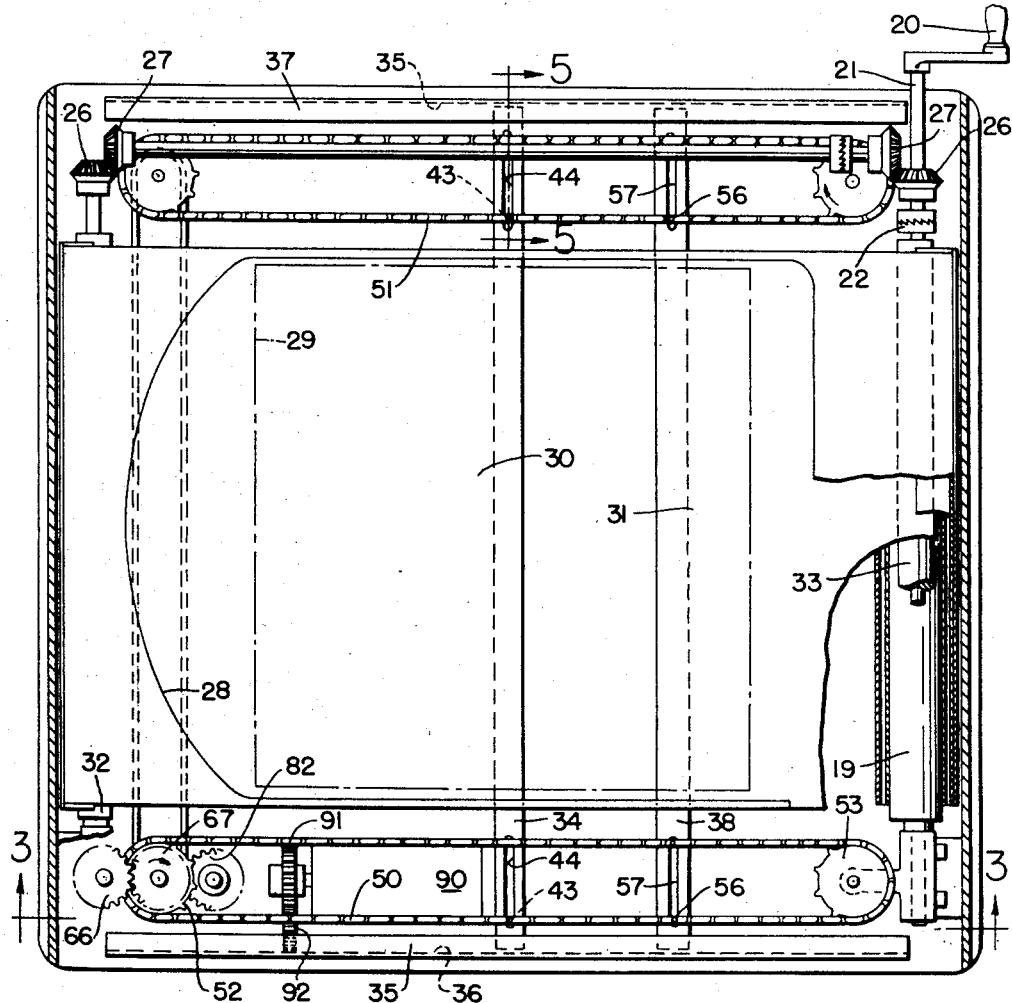
FIG. 2
FIG. 7
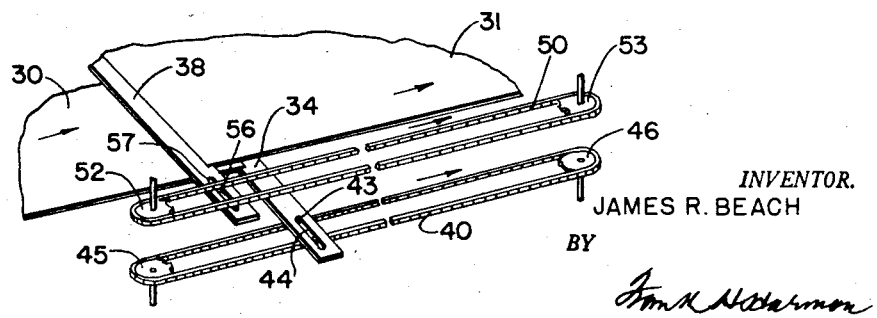
INVENTOR.
JAMES R. BEACH
BY
ATTORNEY

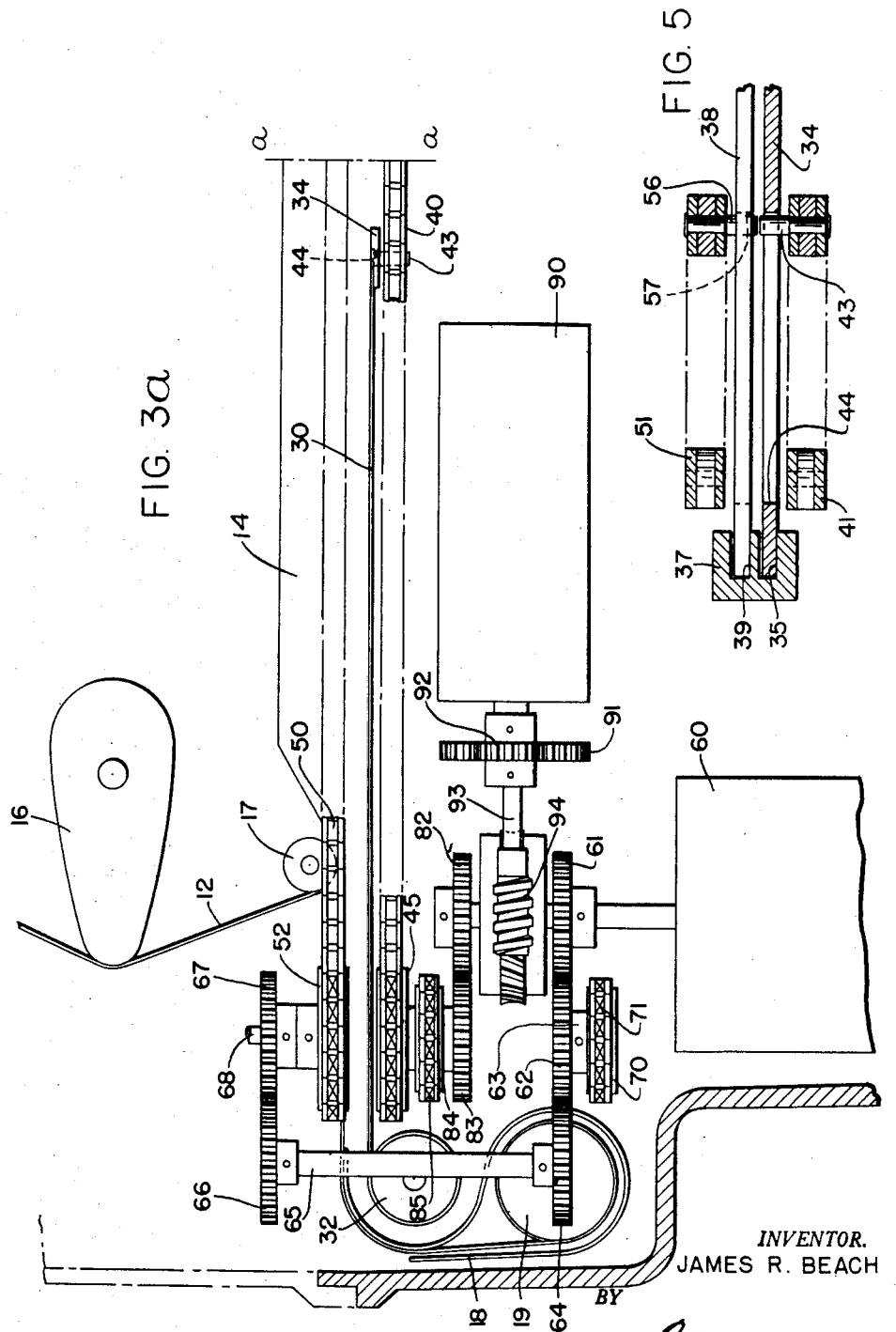

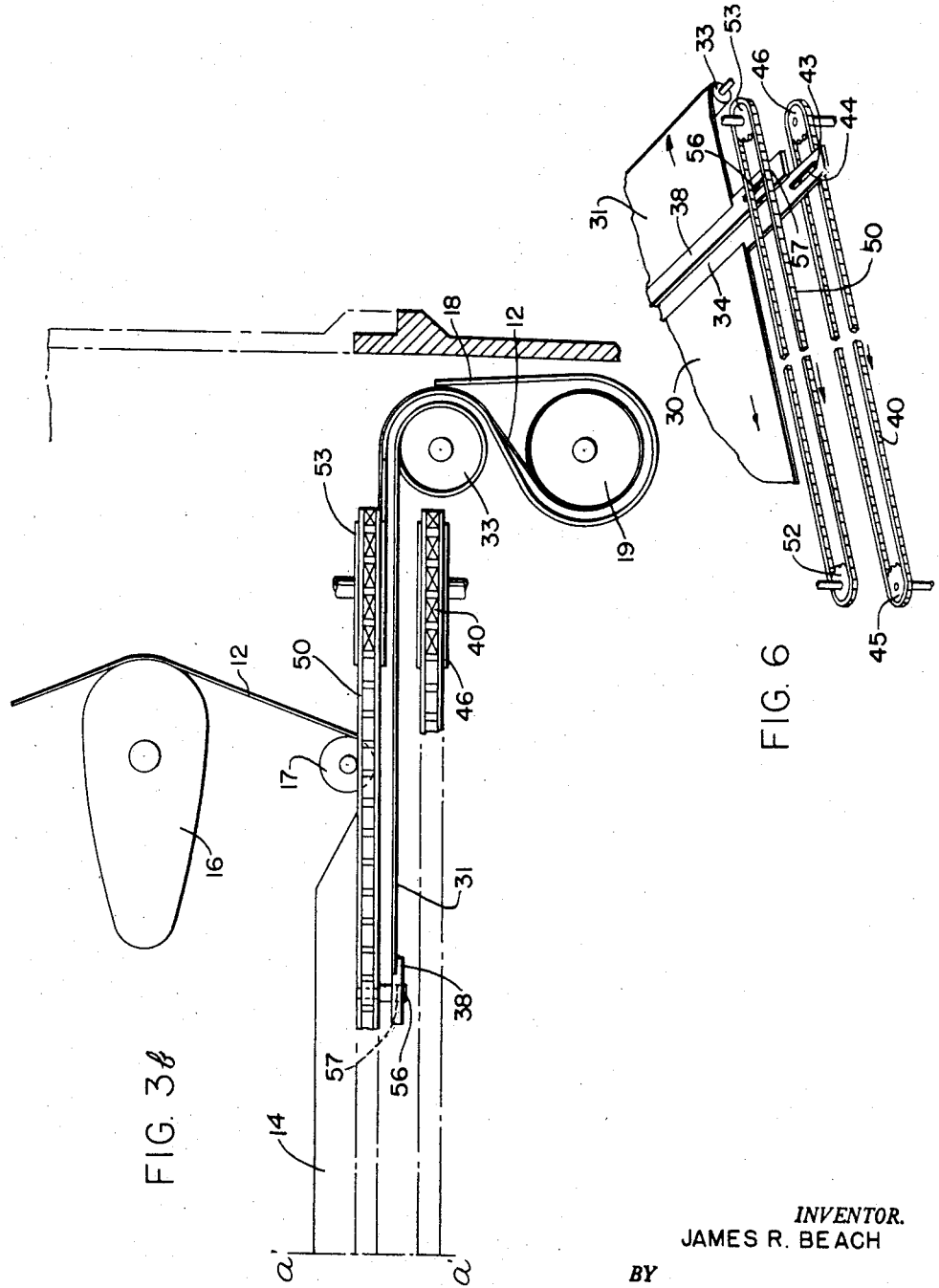

March 17, 1959

J. R. BEACH 2,877,698

FOCAL PLANE SHUTTER

Filed May 9, 1955

INVENTOR.
JAMES R. BEACH
BY
ATTORNEY

United States Patent Office 2,877,698
Patented Mar. 17, 1959

2,877,698

FOCAL PLANE SHUTTER

James R. Beach, La Jolla, Calif., assignor to Bill Jack Scientific Instrument Company, Solana Beach, Calif., a corporation of California Application May 9, 1955, Serial No. 506,726

5 Claims. (Cl. 95—57)

The present invention relates to cameras and more particularly to cameras with focal plane shutters.

An important object of the present invention is to provide in a camera a new and improved focal plane shutter which provides a wide range of exposure times and is reliable in operation.

Another object of the present invention is to provide in a camera a new and improved focal plane shutter in which the slit width and the speed of movement of the slit is readily variable.

Another object of the present invention is to provide in a camera a new and improved focal plane shutter in which the width of the slit is variable as the slit is moved across the film being exposed.

Another object of the present invention is to provide in a camera a new and improved focal plane shutter in which a pair of light blocking members, preferably curtains on takeup rolls, are moved by drive means connected thereto across the film in one direction in spaced end to end relationship with the adjacent edges thereof defining a slit and in a return direction across the film with the light blocking members in overlapping relationship to provide a capped shutter.

Another object of the present invention is to provide a new and improved shutter mechanism for a camera in which the free ends of a pair of curtains on take up rolls are moved across the film in a predetermined manner to control the exposure thereof.

Another object of the present invention is to provide in a camera a new and improved focal plane shutter in which light blocking members are moved endwise in spaced relationship across the film in one direction to expose the film and are returned in overlapping relationship by flexible drive means movable in an endless path, an individual flexible drive member being preferably provided for each of the light blocking members.

Another object of the present invention is to provide a new and improved shutter mechanism in which a shutter member is reciprocated by a novel drive means including an endless flexible member movable in a closed path.

Further objects and advantages of the present invention will be apparent from the following detailed description of the preferred embodiment of the present invention taken in conjunction with the accompanying drawings in which:

Figure 2 is a sectional view taken approximately along line 2—2 of Figure 1;

Figures 3a and 3b are sectional views taken approximately along line 3—3 of Figure 2;

Figure 5 is a sectional view taken approximately along line 5—5 of Figure 2;

Figure 6 is a fragmentary view, partly schematic, of the shutter mechanism in its normal, non-operative position;

Figure 7 is a fragmentary view, partly schematic, of the shutter mechanism at the beginning of its return movement.

The present invention is susceptible of various modifications and of uses in various types of cameras and for purposes of illustration has been shown in a camera comprising a housing or casing 10 having suitable means 11, not shown in detail, for admitting light and producing an image in a given plane. In the camera illustrated the light admitting, image producing means is located in the lower end wall of the housing 10, as it is viewed in Figure 1.

Figure 1:
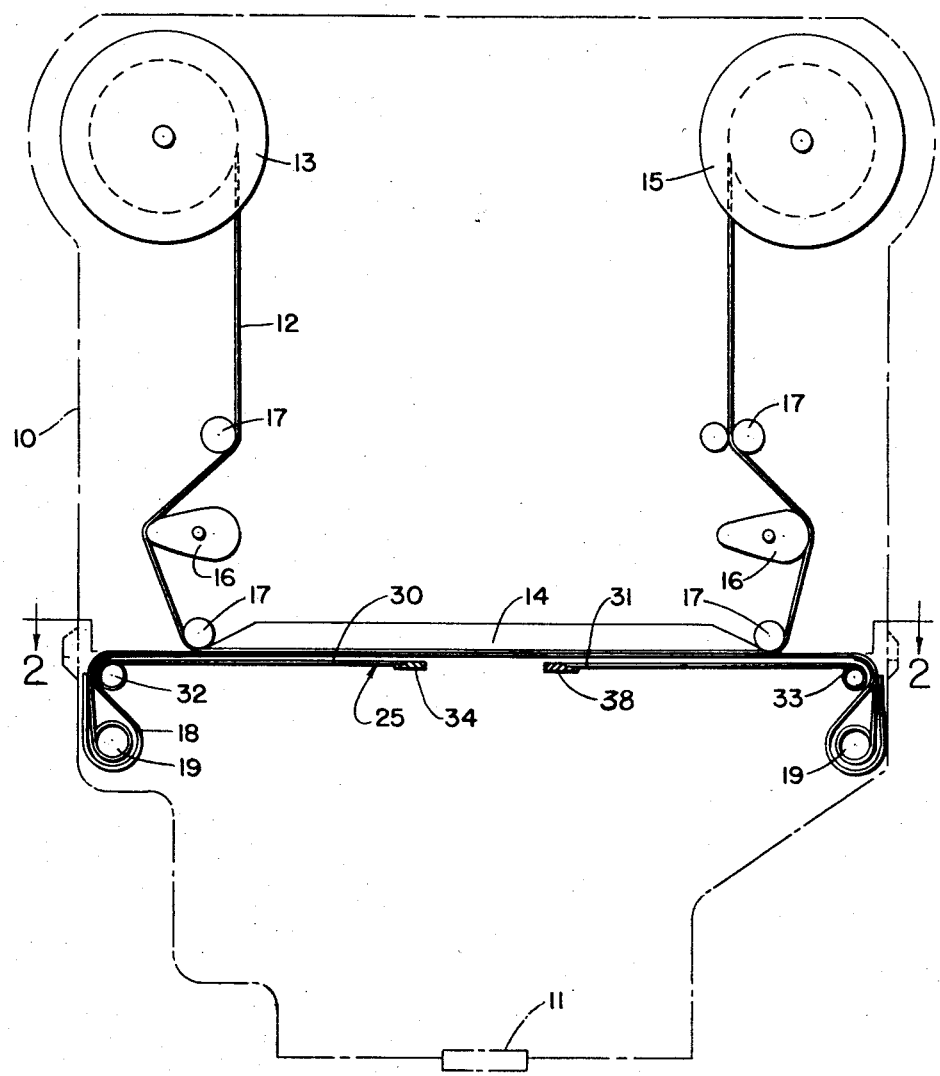
Figure 1 is a view, chiefly diagrammatical, of a camera embodying the present invention.

A film 12 is adapted to be fed from a supply spool 13 rotatably supported adjacent the upper end of housing 10 as it is viewed in Figure 1, across the face of a platen 14, preferably a vacuum platen, positioned opposite the image forming means 11 and onto a storage or take up spool 15. The film is adapted to be transported by suitable feed cams 16 positioned intermediate the supply spool and the platen 14 and intermediate the take up spool 15 and the platen 14. Suitable film guide rolls 17 are provided at the opposite ends of the platen 14.

A film loading guide member 18 has its opposite ends wound on two take up rolls 19 at opposite ends of the platen 14. The guide 18 is adapted to facilitate the loading of the film and is of conventional construction and will not therefore be described in detail. Suffice it to say that the take up rolls 19 are adapted to be operated by a manual drive comprising a handle 20 supported on a shaft 21 coaxial with the take up roll adjacent the right hand side of the camera as it is viewed in Figure 2. The shaft 21 is connected to the take up roll 19 positioned at the right end of platen 14 through a ratchet 22. The shaft 21 also drives the other take up roll 19 through bevel gears 26, 27, a bevel gear 26 being supported on the shaft of the left hand take up roll as viewed in Figure 2. The bevel gears and ratchets are so related that when the handle 20 is turned in one direction, one roll is driven and the other free to rotate and when turned in the other direction the other roll 19 is driven and the previously driven one free to rotate. The loading guide may thus be moved in opposite directions by rotating the handle 20 in opposite directions. The loading guide 18 is provided with an opening 28 adapted to be positioned in front of the platen 14 after the film has been loaded.

A format, not shown, having a format opening, is positioned in front of the film 12 opposite the image forming means 11. The position of the format opening is indicated in dot-dash lines in Figure 2 and designated by the reference numeral 29.

The camera, as thus far described, is of a conventional construction familiar to those skilled in the art and has, therefore, not been described in detail.

According to the present invention, the exposure time of the film 12 is controlled by a focal plane shutter 25 of novel and improved construction. The preferred and illustrated form of the present invention comprises light blocking members or shutter curtains 30, 31, having one end fixed to take up rolls 32, 33, respectively, which are preferably spring loaded. The take up roll 32 for the curtain 30 is supported transversely of the film 12 adjacent to the one end, the left hand end as viewed in the drawings, of the film 12 in exposure position. The free end of the shutter curtain 30 is fixed to a guide member 34 extending transversely of the film in exposure position adjacent to the format opening 29, the opposite ends of the guide member 34 being supported in guideways 35 in guideway members 36, 37, respectively. The guideway members 36, 37 extend parallel to the path of travel of the film on opposite sides of the format opening 29.

The take up roll 33 for the shutter curtain 31 is supported transversely of the film 12 in exposure position and adjacent to the boundary edge thereof remote from the take up roll 32 for the shutter curtain 30. The shutter curtain 31 is movable from the take up roll 33 endwise across the film 12 adjacent the format opening 29 in a plane different from the plane of shutter curtain 30. The free end of shutter curtain 31 is fastened to a guide member 38 extending transversely of the film 12 and format opening 29. The opposite ends of the guide members 38 are supported in guideways 39, only one of which appears in the drawings, parallel to guideways 35 in guideway members 36, 37.

In the preferred and illustrated embodiment each guide member 34, 38 is moved along its guideway in a first direction to draw the curtain fastened thereto across the film to position the curtain in between the film and light admitting means 11, preventing exposure of the film, and in a second direction opposite to the first direction by power actuated, flexible drive means movable in an endless path for each member 34, 38.

The drive means for curtain 30 comprises endless flexible members or chains 40, 41, movable in a closed path parallel to the path of movement of the curtains across the format opening 29, the closed paths of the chains 40, 41, in the illustrated embodiment, being in a plane parallel to the curtains 30, 31. The chains 40 and 41 are positioned along opposite side boundary edges of the portion of film 12 in exposure position and respectively intermediate the film and the guideway members 36, 37, and are operatively connected to the guide member 34 by pins 43 which operate in longitudinally extending slots 44 in the opposite end portions of the guide member. The chain 40 moves about spaced sprockets 45, 46 while the chain 41 moves about spaced sprockets 47, 48.

The sprockets 45, 47 are adapted to be driven causing the chains 40, 41 to move through their closed paths to move the free end of curtain 30 back and forth across the film. As the pins 43 move along the opposite general parallel sides of the paths of the chains, the free ends of the curtains will be moved in opposite directions across the film, the slots 43 preventing the lateral movement of the pin from being transferred to the guide member. While the paths of chains 40, 41 are illustrated as being in planes parallel to the film in exposure position, it will be understood by those skilled in the art that the paths could be otherwise positioned, for example, in a plane perpendicular to the plane of the film in exposure position.

Figure 4:
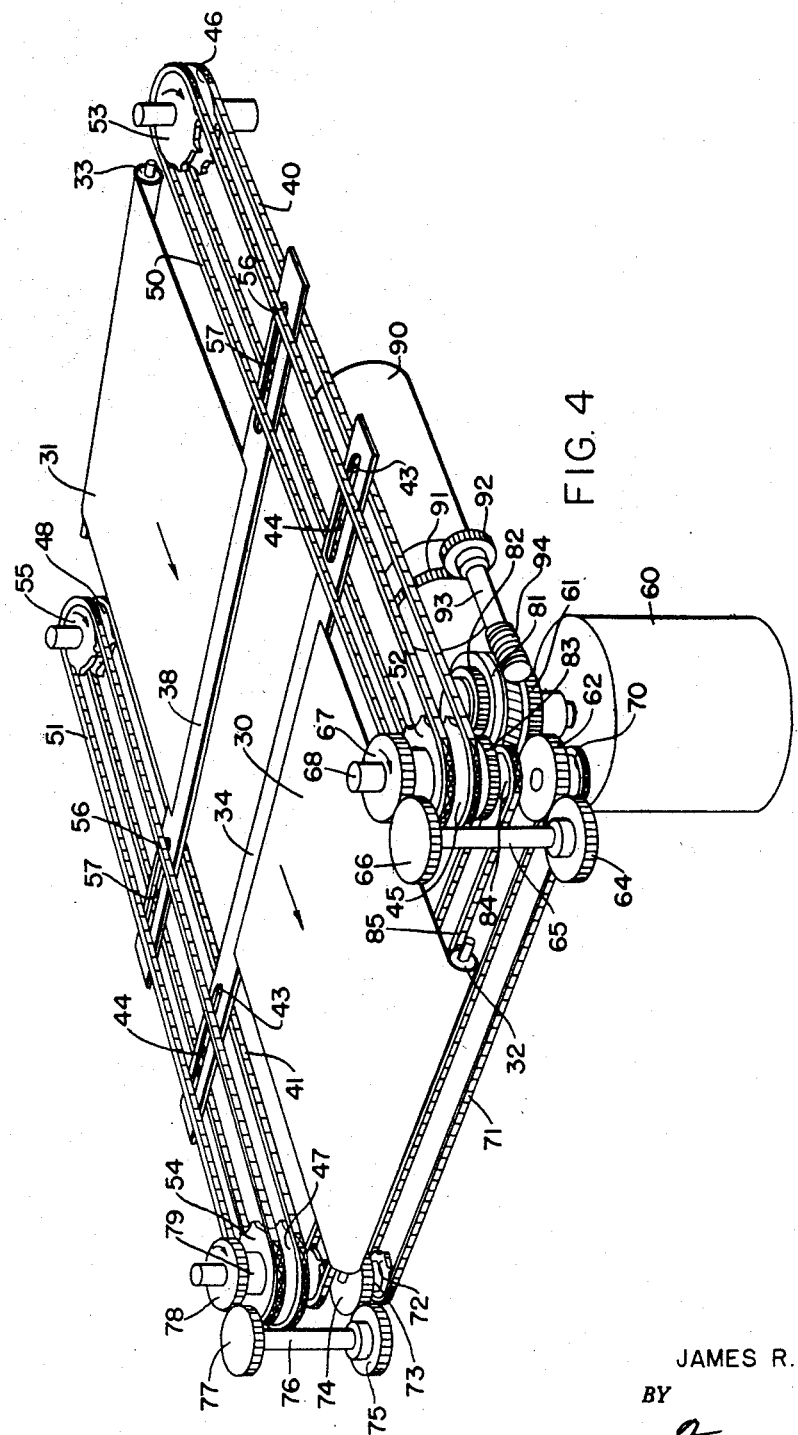
Figure 4 is a detached perspective view of the shutter mechanism of the camera of Figure 1.

The curtain 31 is adapted to be actuated by endless flexible drive members or chains 50 and 51 positioned above the chains 40, 41, respectively, as the camera is viewed in Figure 4. The chains 50 and 51 move around spaced sprockets 52, 53 and spaced sprockets 54, 55, respectively, and are connected to the guide member 38 by drive pins 56 adapted to operate in longitudinal slots 57 in the opposite end portions of the guide member. It will be noted that the curtains are positioned intermediate their chain drives and the pins 43 extend upwardly from the chains 40, 41 while the pins 56 extend downwardly from the chains 50, 51.

When the shutter is in its normal inoperative position the guide members 34 and 38 preferably overlie each other with the drive pins being connected to their respective chain at points on opposite sides of the paths of travel as shown in Figure 6. Assuming that the chains are rotated in a clockwise direction as viewed in Figure 6, the drive pins 56 for curtain 31 would be on the portion of their path of travel approaching the sprockets 53, 55, respectively, and the drive pins 43 for curtain 30 would be on the side of their path of travel leaving their corresponding sprockets 46, 48, respectively. Rotation of the chains will move the shutter curtain 30 forwardly, that is, to the left as viewed in the drawings, and the shutter curtain 31 will follow after the drive pins therefor move around sprockets 53, 55, respectively. The delay in the forward movement of curtain 31 caused by the movement of the drive pins 56 about the sprockets 53, 55, respectively, spaces the adjacent edges of the curtains 30, 31 so as to define a slit, as shown in Fig. 4. This slit will then be moved across the format opening 29 as the chains continue their movement. The curtain 30 will reach the end of its forward travel before the curtain 31 and reverse due to the movement of its drive pins around sprockets 45, 47, respectively. Upon the subsequent reversal of movement of the shutter curtain 31, the curtains will be in overlapped relationship forming a capped shutter, as shown in Fig. 7. The curtain shutters return in this relationship to their original position with the drive pins of curtain 30 moving around the sprockets 46, 48 to a position on the forward travel side of its path of movement.

The respective chain drives are driven by a motor 60 supported within the camera housing. The motor 60 drives the sprocket 52 for the chain 50 through a drive comprising a gear 61 on the motor shaft, a gear 62 keyed to a shaft 63 and continuously in mesh with the gear 61 and a gear 64 keyed to a vertical shaft 65, as viewed in Fig. 4, having a gear 66 keyed to its upper end which meshes with a gear 67 keyed on a shaft 68 supporting the sprocket 52. The shaft 63 for supporting gear 62 also mounts a drive sprocket 70 for a chain 71 which in turn drives a sprocket 72 keyed to a shaft 73 having a gear 74 fixed thereto. The gear 74 is continuously in mesh with a gear 75 fixed to one end of a shaft 76 having a gear 77 keyed to its other end. The gear 77 is continuously in mesh with a gear 78 fixed to a shaft 79 mounting the drive sprocket 54 for the chain 51.

The sprocket 45 is rotated from the motor 60 by a drive from the motor including a differential gear unit 81 of conventional construction, the motor 60 being connected to an input element thereof, and a gear 82 rotated by the output element of the differential unit. The gear 82 is continuously in mesh with a gear 83 fixed to a shaft mounting the sprocket 45 and a sprocket 84. The sprocket 84 is the driving sprocket for a chain drive 85 for rotating the shaft carrying sprocket 47.

A reversible motor 90 for adjusting the width of the exposure slit either prior to the operation of the shutter or during travel of the slit across the film is operatively connected to the differential gear unit 81 so that the output of the differential to gear 82 is the algebraic sum of the rotation imparted to the differential by the motors 60, 90. The drive to the differential from the motor 90 includes a gear 91 on the shaft of motor 90, a gear 92 continuously in mesh therewith and fixed to one end of a shaft 93 mounting a worm gear 94 continuously in mesh with the carrier element of the differential.

The differential gear unit 81 may be of any well known type wherein the output shaft rotation is the algebraic sum of the rotations set into the unit by the rotation of the primary input element and the rotation of a secondary carrier or ring input element. A differential gear unit of this type is shown in Fig. 1 of U. S. Patent No. 2,399,685 to H. M. McCoy, and described at page 3, column, 1, lines 51–68 of said patent.

The operation of the motor 90 will move the curtain 30 with respect to curtain 31 regardless of whether or not the shutter is being operated. It, therefore, is apparent that the motor 90 imparts extreme flexibility to the shutter as to slit width and exposure times available.

It may now be seen that the present invention accomplishes the objects heretofore enumerated and provides a new and improved focal plane shutter comprising a pair of independently movable shutter members adapted to be positioned in spaced endwise relationship to form a slit which is movable across the film to be exposed by flexible drive means connected to the members and movable in endless paths, the drive means returning the shutter members in overlapping relationship upon the completion of the exposure.

The preferred embodiment of the present invention has been described in considerable detail and further modifications, constructions and arrangements will be apparent to those skilled in the art to which the invention relates and it is my intention to cover hereby all such modifications, constructions and arrangements which fall within the scope of the appended claims.

What I claim is:

1. A camera comprising a camera housing, means for supporting film to be exposed in an exposure position in a plane within said housing, said housing having means for admitting light to expose the film, and a shutter mechanism intermediate said plane and said light admitting means for controlling the time of exposure of the film comprising first and second shutter members each reciprocable between a position substantially covering the film to be exposed and a position substantially clear of the film to be exposed, the substantially clear positions of said shutter members being adjacent opposite boundary edges of the film in exposure position thereof, means for reciprocating said shutter members across the film to be exposed in timed relation to expose the film comprising first and second power actuated members movable in closed elongated paths, each path having two sides substantially parallel to the movement of said shutter members across said plane, first connecting means connecting said first shutter member to said first power actuated member, second connecting means connecting said second shutter member to said second power actuated member, said first and second connecting means traversing opposite sides of the paths of travel of said power actuated members to move said shutter members in opposite directions across the film in said plane and reversing directions of movement upon traversing the closed ends of said paths, one of said connecting means reversing direction of movement at each end of its path of travel prior to the reversal of the other connecting means, said shutter members having an initial position in generally endwise relationship adjacent one of said boundary edges of the film in the plane of exposure with the adjacent edges of the shutter members generally opposed to each other in light blocking relationship and the respective connecting means of the shutter members on opposite sides of their paths of travel.

2. A camera comprising a camera housing, means for supporting film to be exposed in an exposure position in a plane within said housing, said housing having means for admitting light to expose the film, and a shutter mechanism intermediate said plane and said light admitting means for controlling the time of exposure of the film comprising first and second shutter members each reciprocable between a position substantially covering the film to be exposed and a position substantially clear of the film to be exposed, the substantially clear positions of said shutter members being adjacent opposite boundary edges of the film in exposure position thereof, means for reciprocating said shutter members across the film to be exposed in timed relation to expose the film comprising first and second power actuated members movable in closed elongated paths, each path having two sides substantially parallel to the movement of said shutter members across said plane, first connecting means connecting said first shutter member to said first power actuated member, second connecting means connecting said second shutter member to said second power actuated member, said first and second connecting means traversing opposite sides of the paths of travel of said power actuated members to move said shutter members in opposite directions across the film in said plane and reversing directions of movement upon traversing the closed ends of said paths, one of said connecting means reversing direction of movement at each end of its path of travel prior to the reversal of the other connecting means, said shutter members having an initial position in generally endwise relationship adjacent one of said boundary edges of the film in the plane of exposure with the adjacent edges of the shutter members generally opposed to each other in light blocking relationship and the respective connecting means of the shutter members on opposite sides of their paths of travel, wherein said shutter members are curtains and first and second take up rolls for said curtains respectively are supported adjacent said opposite boundary edges of the film in exposure position.

3. A camera comprising a camera housing, means for supporting film to be exposed in an exposure position in a plane within said housing, said housing having means for admitting light to expose the film, and a shutter mechanism intermediate said plane and said light admitting means for controlling the time of exposure of the film comprising first and second curtain members each reciprocable between a position substantially covering the film to be exposed and a position substantially clear of the film to be exposed, the substantially clear positions of said curtain members being adjacent opposite boundary edges of the film in exposure position thereof, first and second take up rolls for said first and second curtain members, respectively, and supported adjacent said opposite boundary edges of the film to be exposed, means for reciprocating said curtain members across the film to be exposed in timed relation to expose the film comprising first and second power actuated members movable in closed elongated paths, each path having two sides substantially parallel to the movement of said curtain members across said plane, first connecting means connecting said first curtain member to said first power actuated member, second connecting means connecting said second curtain member to said second power actuated member, said first and second connecting means traversing opposite sides of the paths of travel of said power actuated members to move said curtain members in opposite directions across the film in said plane and reversing directions of movement upon traversing the closed ends of said paths, one of said connecting means reversing direction of movement at each end of its path of travel prior to the reversal of the other connecting means, said curtain members having an initial position in generally endwise relationship adjacent one of said boundary edges of the film in the plane of exposure with the adjacent edges of the curtain members generally opposed to each other in light blocking relationship and the respective connecting means of the curtain members on opposite sides of their paths of travel, said power actuated members being continuous flexible members.

4. A camera comprising a camera housing, means for supporting film to be exposed in an exposure position in a plane within said housing, said housing having means for admitting light to expose the film, and a shutter mechanism intermediate said plane and said light admitting means for controlling the time of exposure of the film comprising first and second shutter members each reciprocable between a position substantially covering the film to be exposed and a position substantially clear of the film to be exposed, the substantially clear positions of said shutter members being adjacent opposite boundary edges of the film in exposure position thereof, means for reciprocating said shutter members across the film to be exposed in timed relation to expose the film comprising first and second power actuated members movable in closed elongated paths, each path having two sides substantially parallel to the movement of said shutter members across said plane, first connecting means connecting said first shutter member to said first power actuated member, second connecting means connecting said second shutter member to said second power actuated member, said first and second connecting means traversing opposite sides of the paths of travel of said power actuated members to move said shutter members in opposite directions across the film in said plane and reversing directions of movement upon traversing the closed ends of said paths, one of said connecting means reversing direction of movement at each end of its path of travel prior to the reversal of the other connecting means, and means supporting said shutter members in an initial position in generally endwise relationship adjacent one of said boundary edges of the film in the plane of exposure with the adjacent edges of the shutter members generally opposed to each other in light blocking relationship and the respective connecting means of the shutter members on opposite sides of their paths of travel, means for driving said power actuated members through their paths at the same speed and including means for driving said power actuated members at different speeds.

5. A camera comprising a camera housing, means for supporting film to be exposed in an exposure position in a plane within said housing, said housing having means for admitting light to expose the film, and a shutter mechanism intermediate said plane and said light admitting means for controlling the time of exposure of the film comprising first and second shutter members each reciprocable between a position substantially covering the film to be exposed and a position substantially clear of the film to be exposed, the substantially clear positions of said shutter members being adjacent opposite boundary edges of the film in exposure position thereof, means for reciprocating said shutter members across the film to be exposed in timed relation to expose the film comprising first and second power actuated members movable in closed elongated paths, each path having two sides substantially parallel to the movement of said shutter members across said plane, first connecting means connecting said first shutter member to said first power actuated member, second connecting means connecting said second shutter member to said second power actuated member, said first and second connecting means traversing opposite sides of the paths of travel of said power actuated members to move said shutter members in opposite directions across the film in said plane and reversing directions of movement upon traversing the closed ends of said paths, one of said connecting means reversing direction of movement at each end of its path of travel prior to the reversal of the other connecting means, said shutter members having an initial position in generally endwise relationship adjacent one of said boundary edges of the film in the plane of exposure with the adjacent edges of the shutter members generally opposed to each other in light blocking relationship and the respective connecting means of the shutter members on opposite sides of their paths of travel, and means for moving said power actuated members relative to each other.

References Cited in the file of this patent
UNITED STATES PATENTS

| | | |
|---|---|---|
| 684,750 | Fraley | Oct. 15, 1901 |
| 709,079 | Donitz | Sept. 16, 1902 |
| 792,245 | Anderson | June 13, 1905 |
| 924,947 | Thornton | June 15, 1909 |
| 1,854,892 | Ewend | Apr. 19, 1932 |
| 2,134,766 | Schieber et al. | Nov. 1, 1938 |
| 2,283,533 | Brueske | May 19, 1942 |
| 2,407,277 | Hineline | Sept. 10, 1946 |
| 2,472,607 | Mihalyi | June 7, 1949 |

FOREIGN PATENTS

| | | |
|---|---|---|
| 204,875 | Germany | Dec. 8, 1908 |